United States Patent
Sebastian

(10) Patent No.: US 7,352,749 B2
(45) Date of Patent: Apr. 1, 2008

(54) DEVICE FOR CHECKING NUMBERS AND METHOD FOR CHECKING NUMBERS

(75) Inventor: Zylowski Sebastian, Zielona Góra (PL)

(73) Assignees: Advanced Digital Broadcast Polska SP. ZO.O., Zielona Góra (PL); Advanced Digital Broadcast Ltd., Taipei (TW)

( * ) Notice: Subject to any disclaimer, the term of this patent is extended or adjusted under 35 U.S.C. 154(b) by 765 days.

(21) Appl. No.: 10/899,514

(22) Filed: Jul. 26, 2004

(65) Prior Publication Data

US 2005/0027762 A1 Feb. 3, 2005

(30) Foreign Application Priority Data

Aug. 1, 2003 (PL) .................................. 361531

(51) Int. Cl.
*G06F 7/00* (2006.01)
(52) U.S. Cl. ........................ 370/392; 370/394
(58) Field of Classification Search ................ 370/392, 370/474, 532, 533, 534, 535, 536, 537, 538, 370/539; 708/1, 2, 3, 4, 552; 713/182; 380/241
See application file for complete search history.

(56) References Cited

U.S. PATENT DOCUMENTS 4,218,756 A * 8/1980 Fraser ........................ 711/201

FOREIGN PATENT DOCUMENTS

EP 0 949 808 A2 10/1999

* cited by examiner

*Primary Examiner*—Nick Corsaro
*Assistant Examiner*—Anh Ngoc Nguyen
(74) *Attorney, Agent, or Firm*—Matthias Scholl P.C.; Matthias Scholl

(57) ABSTRACT

A device for checking numbers consists of a multiplexer (101) with a controller module (106) linked to it. An output of the multiplexer is connected to a first input of a register (102), which is an element of memory, while a first output of the controller module (106) is connected to an input of a storage (103) and a second input of the register (102). An output of the register (102) and an output of the storage (103) are connected to inputs of the adder (104), which adds on its output a number, stored in the register (102) and a number written in the storage (103) at an address indicated by the controller module (106). The adder (104) generates on its output a carry-out signal, informing about overflow, which is passed to a first controlling input of the controller module (106), which manages operation of the device checking numbers. A second controlling input of the controller module (106) is coupled a logical NOR type gate (105) passing a zero signal informing that the number on the output of the adder (104) equals zero.

9 Claims, 4 Drawing Sheets

DEVICE FOR CHECKING NUMBERS AND METHOD FOR CHECKING NUMBERS

CROSS-REFERENCE TO RELATED APPLICATIONS

This application claims priority to Polish Application No. P-361531, filed Aug. 1, 2003, the contents of which are incorporated herein by reference.

BACKGROUND OF THE INVENTION

1. Field of the Invention

The present invention relates to a device for checking numbers and a method for checking numbers, which can be applied in a digital television decoder, especially designed for comparing PID numbers (Packet Identifier) of received data packets.

2. Brief Description of the Background of the Invention Including Prior Art

The method of implementing a PID filter (Packet Identifier) was described in the patent application EP 0 949 808. According to this method a table is created. The table stores values used for the purpose of comparison. The system uses a comparator to find out whether the given values—the first from circuit inputs and the second from the table—are equal. Moreover, a FIFO type (First-in, First-out) output queue is also applied. The output FIFO queue allows for initiating read operations, until such a time that the input data packet is defined as the correct one. When the PID data are given onto the system inputs, the comparator compares the given value with the stored values table, which was created earlier by the programming circuit.

In the case of joining or multiplexing of two signal streams, in which certain services have the same PID numbers, packets from the two services may mix. This may, at a later stage of signal processing, cause a conflict of PID numbers.

SUMMARY OF THE INVENTION

Purposes of the Invention

It is an object of this invention to provide a device for multiplexing different signal streams without causing a conflict of PID numbers.

It is another object of this invention to provide a method for increasing security while sending packets from few services.

These and other objects and advantages of the present invention will become apparent from the detailed description, which follows.

BRIEF DESCRIPTION OF THE INVENTION

In order to eliminate conflicts of PID numbers, a circuit was developed, that allows changing the PID numbers of one or more of the processed packets, prior to the further stages of signal processing. For this purpose, the circuit was designed to ensure the possibility of checking if a PID number is located within a specific range, and to allow for modifying its value. According to the invention, data used for comparisons are stored in RAM or ROM memory, while the comparison process itself is conducted by the means of a recurrence system, the structure of which does not include comparators. This system was realized through the appropriate control of the integral adder.

The circuit for checking numbers includes a multiplexer for receiving a checked number linked to a controller module. The multiplexer has a first multiplexer input, a second multiplexer input and a multiplexer output. The controller module linked to the multiplexer has a controller module output, a first controlling input and a second controlling input. The output of the multiplexer is connected to one input of a register, which is a memory element, while one of the outputs of the controller module is connected to a memory, and the second to the second register input. The register is used for temporary storing a temporary number whereas the memory is used for storing information related to ranges of incoming PID numbers. The register output and the memory output are connected to inputs of the adder, which sums up, on its output, the number stored in the register and the number stored in the memory under an address indicated by the controller module and sends a result of summing to the multiplexer. On its output, the adder also generates an informing signal, which is transmitted to one of the control inputs of the controller module, which in turn manages the operation of the whole system. The carry-out signal causes modification of the checked number sent to the first multiplexer input when the checked number is within a checked range belonging to the ranges of incoming PID numbers. A NOR-type logical gate is placed in the second controlling track of the controller. This gate generates a signal, informing that the number, on the output of the adder, is equal to zero and the checked number is equal to a lower-limit value or an upper-limit value of a checked range of the incoming PID numbers.

The method of checking whether a given -number is within the given range goes as follows. A reading is taken from the memory of the lower coefficient of the register range. Numbers from the register are summed with the value from memory, given at the input of the adder. If the result, i.e. a first sum, of adding causes the carry-out output to be set, it means that the number is higher than the lower range value.

The result of the previous summing is then recorded in the register, and the upper coefficient of register range is read from the memory. This coefficient is added to the previous result. If the result, i.e. a second sum, of the adding does not cause the carry-out value to be set, it means that the number—in the case when the previous addition set the index of carry-out—is within the checked range. In the case, when the given number is within the checked or defined range, it is changed by the defined value. Both the lower-limit and the upper-limit coefficients of the range, as well as the coefficient of correction are stored in the memory. The values of numbers is stored according to the sequence of checking under the consecutive addresses in the memory, where the first coefficient is the lower-limit coefficient of the range, the second coefficient is the upper-limit coefficient of the range, and the last coefficient is the correction coefficient. In the case where the number is within the appropriate range, the correction coefficient is read from the memory and added to the previous result of adding. In order to check if a number is equal to the lower-limit or the upper-limit value of the range of the incoming PID numbers, a check is made if the first sum or the second sum equals 0. The number is also corrected by the correction coefficient when the first sum or the second sum equals zero.

The lower and the upper coefficients depend on the lower-limit and the upper-limit values. The lower coefficient equals (–low_range_X), the upper coefficient equals (low_range_X–highrange_X) and the correction coefficient equals (correction_X+high_range_X), where correctionX is a correction value, low_range_X is the lower-limit value of the range of the incoming PID numbers and the high_range_X is the upper-limit value of the range of the incoming PID numbers. The lower-limit and the upper-limit values of each range of the ranges are stored in a sequence and at increasing addresses of the memory wherein a first value of the sequence is the lower coefficient, a second value of the sequence is the upper coefficient and a third value of the sequence is the correction coefficient.

The novel features, which are considered as characteristic for the invention, are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings one of the possible embodiments of the present invention is shown, where.

DESCRIPTION OF INVENTION AND PREFERRED EMBODIMENT

Figure 1:
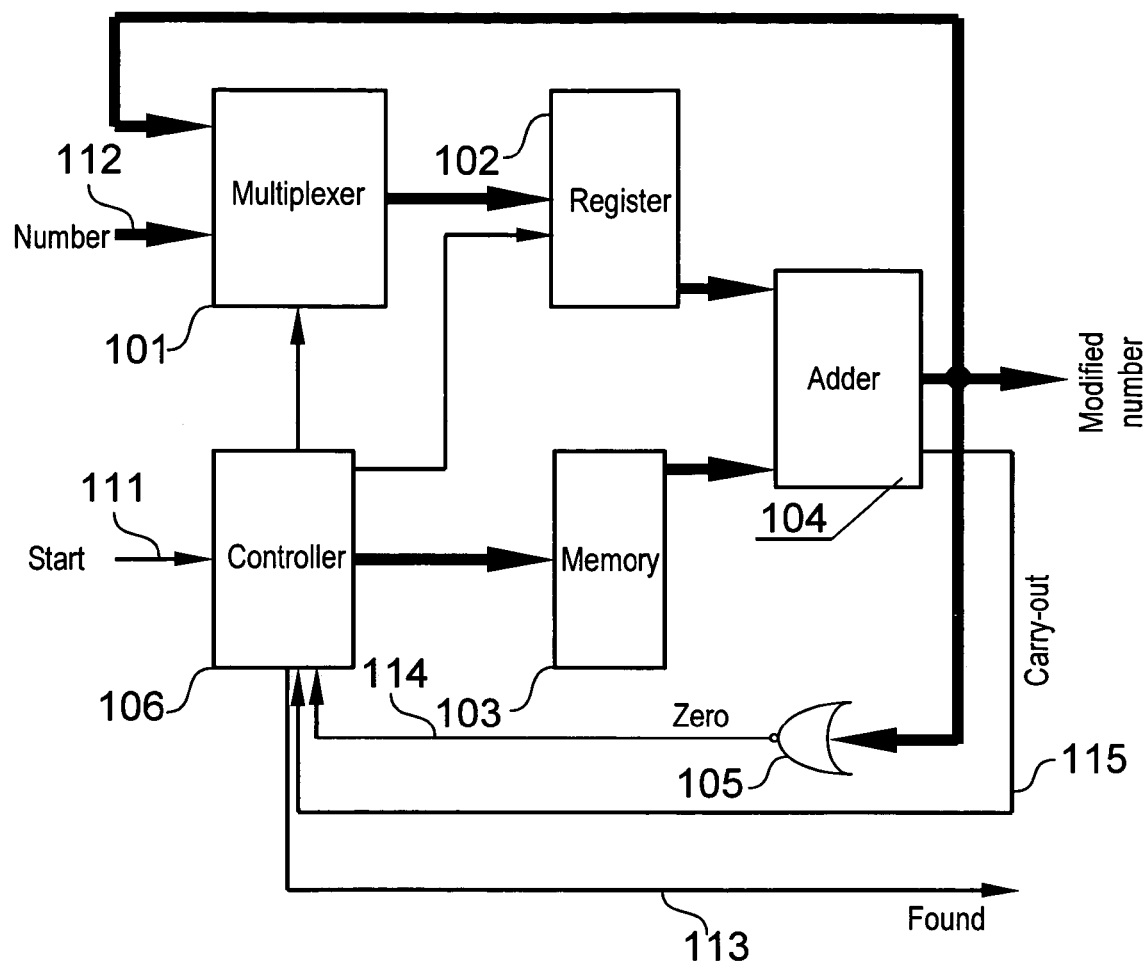
FIG. 1 is a schematic diagram of a circuit for checking numbers.

As it has been shown in FIG. 1, in which the bold arrows mark multi-bit signals, the digital circuit performing a function of checking numbers contains a multiplexer 101 and a controller module 106 connected to it. An output of the multiplexer is connected to a first input of a register 102, which is a memory element. One of outputs, for example a first output of the controller module 106 is connected to an address input of a memory 103, and the second output is connected to a second input of the register 102. An output of the register 102 and an output of the memory 103 are connected to inputs of an adder 104, which sums—on its output—the number stored in the register 102 and the number recorded in the memory 103 at an address indicated by the controller module 106. The result of adding is called a first sum and a second sum. The adder 104 also generates, on its output, a CARRY_OUT signal 115, informing about the carry-out. This signal is transmitted to one of controlling inputs, for example a first controlling input, of the controller module 106 managing the operation of the entire circuit. In the second controlling track of the controller module 106, a NOR-type logical gate 105 is located. It generates the signal ZERO 114, informing that the number on the output of the adder 104 is equal to zero. This signal is transmitted to the input of the controller module 106. Operation of the controller is initiated by the signal START 111.

The ZERO signal 114 is used to determine whether a number is equal to a lower or an upper limit of a checked range. The NOR gate can be omitted when there is only a need to check if a number is greater than the lower limit and smaller than the upper limit.

On its outputs, the multiplexer 101 may produce either a new number or the number provided by the adder, while the controller module 106 decides, which of the input values are to appear on the outputs of the multiplexer. The input number 112, the current state of the adder, and a signal controlling the choice, generated by the controller module 106, are passed to the inputs of the multiplexer 101. The register 102 is the element, which stores the number read from the output of the multiplexer 101. The moment of latching of the input data is controlled by the controller module 106 that caused that the adder 104 generates an output signal, namely the CARRY_OUT signal 115, which informs about the carry-out. The task of the adder 104, as mentioned above, is to put to the output, the sum of the number stored in the register 102, and the number recorded in the memory 103 at the address, indicated by the controller module 106. The adder 104 does not have a carry-in signal. The number from register 102 and a number recorded in the memory 103, are given to the inputs of the adder 104. Limit coefficients of the range and a correction coefficient, with which the number stored in the register 102 should be modified, are stored in the memory 103. The input signals and the addresses, are controlled by the controller module 106, which manages the operation of the entire circuit by sending control signals to the modules 101, 102, 103.

In the described circuit, the limit coefficients of the range are placed in the memory 103. These coefficients are: a lower L_range_X and an upper U_range_X—used for comparisons, as well as the coefficient Corr_X—with which the number should be modified. The memory may be either RAM or ROM, depending on the requirements of the circuit. In other embodiments, it maybe a circuit of multiplexers, giving specific values (ranges) depending on signals from the controller module. Thanks to the setting of numbers, presented below and placed in RAM memory, one individual carry-out signal from the adder suffices to enable the controller module to determine if the number falls within the range.

Figure 2:
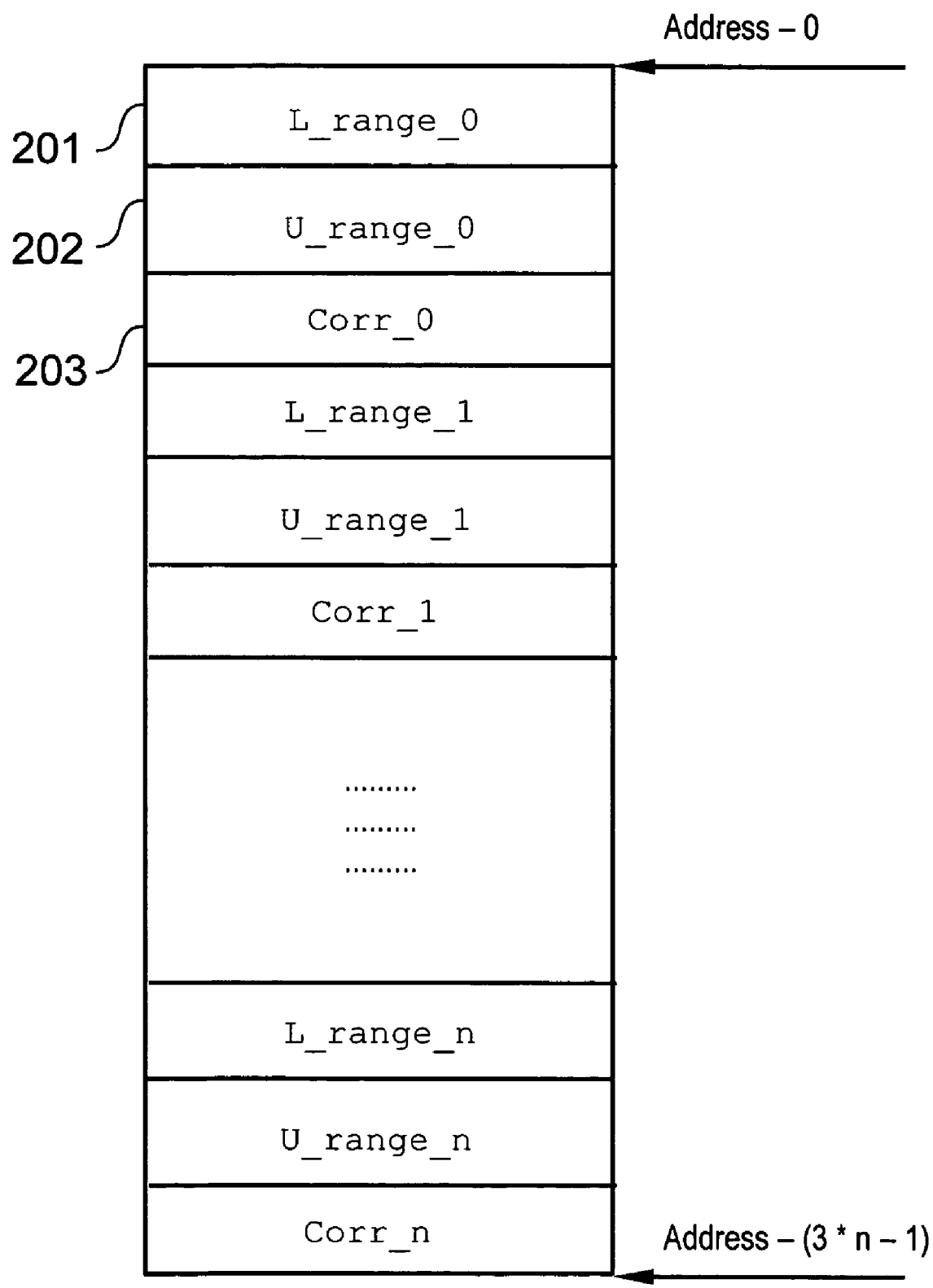
FIG. 2 is a memory map.

The circuit memory map is shown in FIG. 2. Data are recorded in the memory according to the following sequence: the lower coefficient, called also a lower-limit coefficient of the range i.e. L_range_X 201, the upper coefficient, called also an upper-limit coefficient of the range, i.e. U_range_X 202, and lastly the correction coefficient i.e. Corr_X 203. In order for the circuit to function properly, the numbers of the L_range_X, the U_range_X and the Corr_X should be calculated as given below. It is assumed that the value of the high_range_X is the upper-limit value of the range of the incoming PID numbers, the low_range_X is the lower-limit value of the range of the incoming PID numbers, and the correction_X is the correction value.

$$L\_range\_X = -low\_range\_X$$

$$U\_range\_X = -(high\_range\_X - low\_range\_X)$$

$$Corr\_X = correction\_X + high\_range\_X$$

Figure 3:
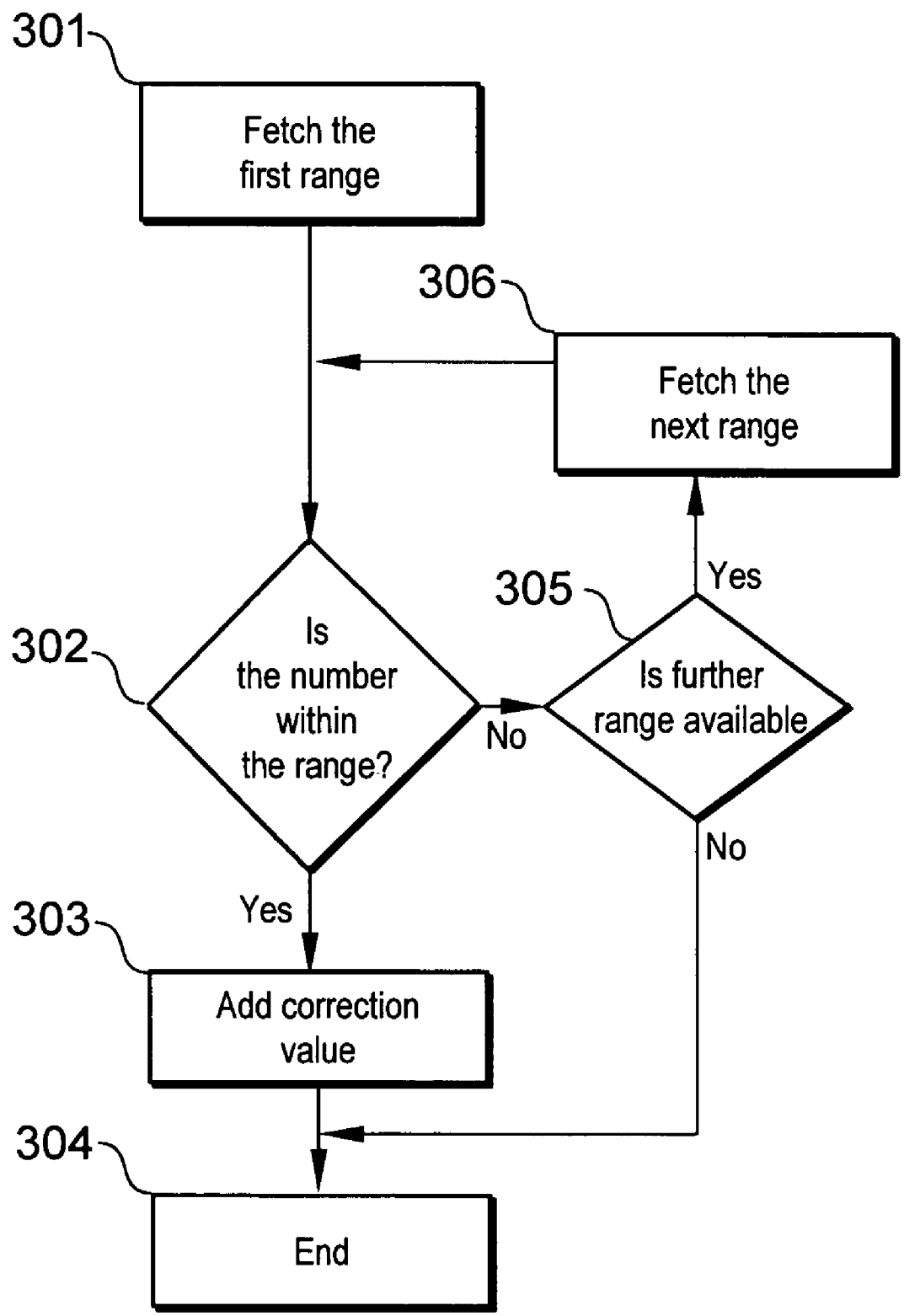
FIG. 3 is a flow chart of operation of the circuit shown in FIG. 1.

FIG. 3 shows the method of operation of the circuit shown in FIG. 1. The procedure starts in step 301, where the first range is set. Next, in step 302, a check is performed to find out whether the number is greater or equal to the lower-limit value of the checked range, and—at the same time—whether the number is lower or equal to the upper-limit value of the checked range. If the number is within this range, it is modified in step 303. In the opposite case, in step 305 a check is performed to establish if all ranges were checked. If not, a move to step 306 is made. In the opposite case, the procedure is concluded in step 304. If there was a move made to step 306, the next range to be checked is collected.

Figure 4:
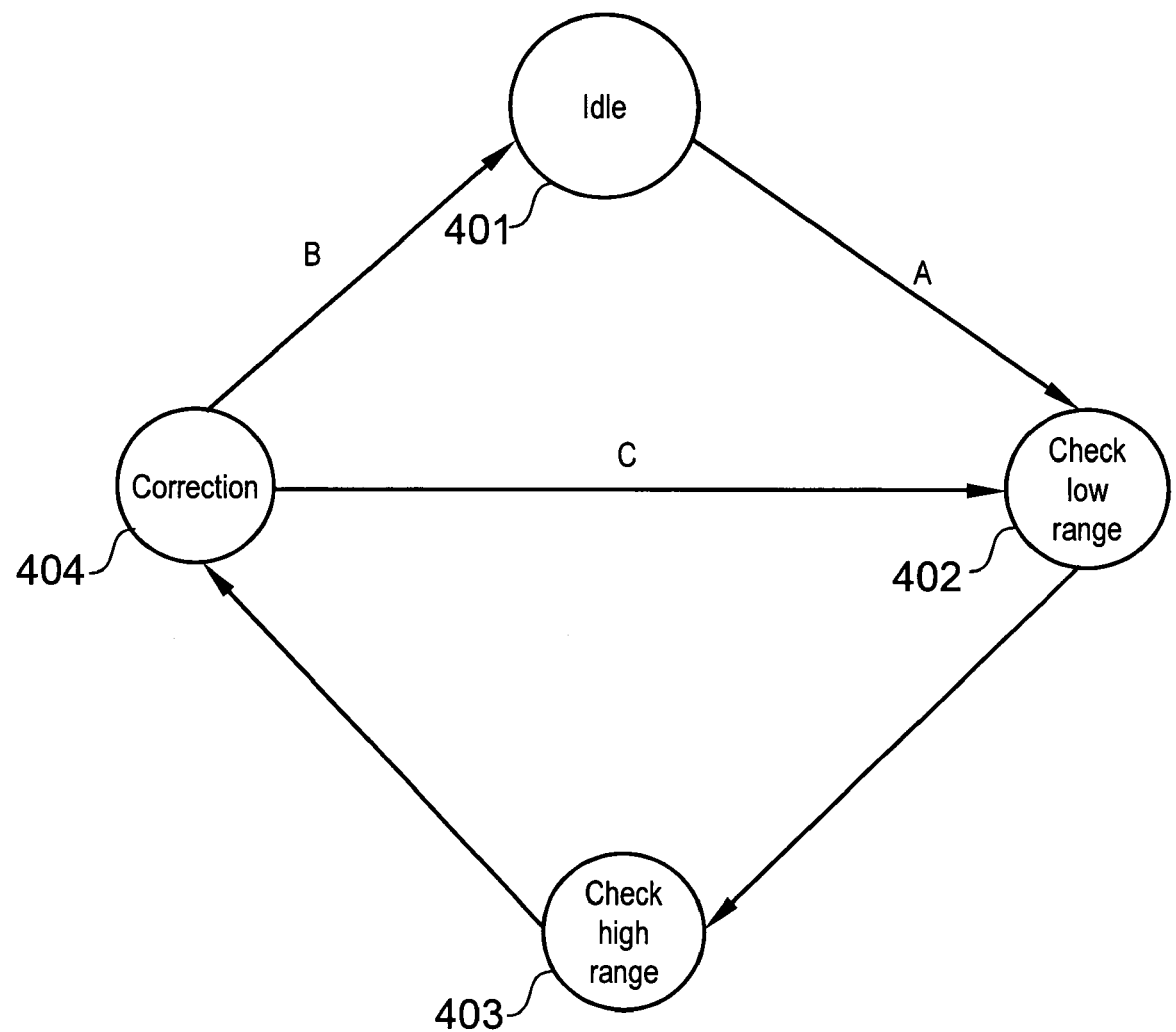
FIG. 4 is a graph of states of a controller module.

The graph of the state of a block comparing the numbers—the controller module 106—is shown in FIG. 4. In an idle state, i.e. in state 401, the circuit waits until the condition A is fulfilled, i.e. until the signal START 111 is received. After receiving it, the circuit sets the signal FOUND 113 to zero, and resets the memory address counter. It then moves on to state 402, where a check of lower range is made. In state 402, the number from the input circuit is written in the register 102. In this state, a reading of the coefficient L_range_X, from the memory 103, is also made, and the number from the register 102 is added to the value given on the input of the adder 104 from the memory 103. If the result of the adding causes the setting of the carry-out signal, it means that the number is greater than value of the lower range. Next, the circuit moves to state 403, where the upper range is checked, increasing the counter of address value of the memory 103 and storing the occurrence of the carry-out.

In state 403, the result of the previous addition is written in the register 102 and the coefficient U_range_X is read from the memory 103. This coefficient is added to the previous result. If the result of the summing does not cause the setting of the carry-out indicator, and if the previous adding has set the carry-out indicator, it means that the number is lower than the upper value of the range. The circuit moves on to state 404, where the number is modified with the set value. In state 404, the carry-out value, stored in state 403 is updated. This variable is set, if the carry-out appeared at the first adding, and did not appear at the second adding. In such case, the number from the input falls within range low_range_X and high_range_X.

In state 404, the coefficient Corr_X is read from the memory 103, and added to the previous result of the adding, which saves one cycle of the timer. This timer cycle could have been used to store the original value in the register, in the case when the previously generated sum had not been used. Thanks to it, if the comparison indicated that the number falls within the range, there is a number modified with correction value correction_x at the output of the adder 104. In the case the given number is found to fall within the checked range (condition B), a shift to state 401 is made, and the found indicator is set. A move to state 401 is also made in the case when all the ranges are found to have been checked (memory address>=max, where max=3* n−1, and n means the number of ranges from FIG. 2). In such a case, the 'found' signal 113 is reset. If the number does not fall within the checked range, and if all ranges were not checked (condition C), there is a move made to state 402, with a simultaneous increase of the address counter. The whole process of checking the numbers starts again.

An exemplary process of comparing and correcting the number, placed on the input of the circuit, is presented below. When three-bit numbers: low_range_X, high_range_X, correction_X, and number, are used, it should be noticed that the most significant bit—after changing the numbers to four-bit—is treated either as a sign bit (for example for negative numbers L_range_X and U_range_X), or as a normal informational bit (for numbers greater than 7, result after correction of a number):

low_range_X=0100

L_range_X=1100 high_range_X=0110

L_range_X=1110 correction_X=0011

Corr_X=1001 number=0101

First sum=0001, carry signal is set

Second sum=1111, carry signal is not set

After correction=1000, carry signal is set

The device according to the present invention can be applied in a situation where data packets from two exemplary streams A, B are to be multiplexed into one output stream C. When packets of the stream A have identifiers in the range 100 . . . 199 and the packets of the stream B have identifiers in the range 180 . . . 279 a conflict would arise if the packets were multiplexed without identifiers correction. According to the invention packets of the stream B can be processed by the device where the low_range_B can be set to 180, the high_range_B can be set to 199 and the correction may equal 100. In this case in the output stream C packets with identification numbers 100-199 originate from the stream A and packets unchanged 200-279 originate from the stream B while modified packets 280-299 of the stream C were processed by the filter.

An example of the implementation of the controller module 106, is described below in a code using the VHDL language. The presented example of implementation co-operates with the asynchronous memory, which is controlled only by the address input. In addition, the following timer (CLK), signals are used: the resetting (RESET) signal, and the PID_SECTION signal, which defines the range (filter) in which the number was found. In FIG. 1 the CARRY_OUT signal was marked as 115, the START signal was marked as 111, and the FOUND signal was marked as 113.

```
library IEEE;
use IEEE.std_logic_1164.all;
use IEEE.std_logic_unsigned.all;
entity Controller is
    port (
        CLK: in STD_LOGIC;
        RST: in STD_LOGIC;
        START: in STD_LOGIC;
        CARRY_OUT: in STD_LOGIC;
        ZERO: in STD_LOGIC;
        SEL1: out STD_LOGIC;
        LOAD: out STD_LOGIC;
        FOUND: out STD_LOGIC;
        ADDR: out STD_LOGIC_VECTOR(5 downto 0);
        PID_SECTION: out STD_LOGIC_VECTOR (3 downto 0)
    );
end Controller;
architecture Controller_arch of Controller is
type states is (IDLE, CHECK_LOW, CHECK_HIGH, CORRECT);
constant MAX_ADDRESS : STD_LOGIC_VECTOR
(5 downto 0) := "101111";
signal state : states;
signal carry_out_state : STD_LOGIC;
signal address : STD_LOGIC_VECTOR(5 downto 0);
signal pid_sect: STD_LOGIC_VECTOR(3 downto 0);
begin
ADDR <= address;
LOAD <= '1' when (state=CHECK_LOW)
              or (state=CHECK_HIGH)
              or ((state=CORRECT)
              and (carry_out_state='0')) else START;
PID_SECTION <= pid_sect;
machine: process(CLK, RST)
begin
if RST='0' then
    state <= IDLE;
    FOUND <= '0';
    address <= (others=>'0');
    pid_sect <= (others=>'0');
```

-continued

```
        address <= (others=>'0');
        SEL1 <= '0';
elsif CLK'event and CLK='1' then
    case state is
        when IDLE => if start ='1' then
                        state <= CHECK_Low;
                        FOUND <= '0';
                        address <= (others=>'0');
                        pid_sect <= (others=>'0');
                        SEL1 <= '1';
                    end if;
        when CHECK_LOW => carry_out_state <= CARRY_OUT
                            or ZERO;
                        address <= address + 1;
                        state <= CHECK_HIGH;
                        SEL1 <= '1';
        when CHECK_HIGH => carry_out_state <= carry_out_state
                            and ((not CARRY_OUT) or ZERO);
                        address <= address + 1;
                        state <= CORRECT;
                        SEL1 <= '0';
        when CORRECT => SEL1 <= '0';
                        if carry_out_state = '1'
                            or address = MAX_ADDRESS then
                            state <= IDLE;
                            FOUND <= carry_out_state;
                        else
                            pid_sect <= pid_sect + 1;
                                -- increase filter number
                            state <= CHECK_LOW;
                            address <= address + 1;
                            SEL1 <= '1';
                        end if;
    end case;
end if;
end process machine;
end Controller_arch;
```

The preferred embodiments having been thus described, it will now be evident to those skilled in the art that further variation thereto may be contemplated. Such variations are not regarded as a departure from the invention, the true scope of the invention being set forth in the claims appended hereto.

What is claimed is:

1. A device for checking numbers comprising
a multiplexer having a first multiplexer input for receiving a checked number, a second multiplexer input and a multiplexer output;
a controller module linked to the multiplexer and having a controller module output, a first controlling input, a second controlling input;
a register for temporary storing a temporary number sent by the multiplexer, the register linked to the controller module and being an element of storage and having a register output and a register input connected to the multiplexer output;
a memory for storing information related to ranges of incoming PID numbers, the memory having a storage output and a storage input connected to the controller module output; and
an adder having an adder output, a first adder input connected to the register output and a second adder input connected to the storage output wherein the adder adds the number stored in the register and a number written in the memory at an address indicated by the controller module and sends a result of adding to the second multiplexer input and generates at a carry-out on the adder output a carry-out signal informing about carry-out and being passed to the first controlling input of the controller module and causing modification of the checked number sent to the first multiplexer input when the checked number is within a checked range belonging to the ranges of incoming PID numbers.

2. The device for checking numbers, according to claim 1, characterized in that it comprises a logical circuit, preferably a NOR type gate, linked to the adder and having an output for passing a zero signal to the controller, informing that a number on the adder output equals zero and the checked number is equal to a lower-limit value or an upper-limit value of a checked range of the incoming PID numbers.

3. A method of checking numbers comprising the steps of:
determining a lower coefficient and an upper coefficient of ranges of incoming PID numbers;
recording in a memory the lower coefficient and the upper coefficient of the ranges of the incoming PID numbers;
recording in a register a number from an input of a device for checking numbers; reading the lower coefficient starting from a first range of the ranges of incoming numbers;
calculating a first sum by adding the lower coefficient and a value at the adder input, sent from a register output;
determining thus that the number is greater than a lower-limit value of the range of the incoming PID numbers if the first sum causes setting of an carry-out indicator;
recording the first sum in the register;
reading the upper coefficient of the first range of the ranges of the incoming numbers;
calculating a second sum by adding the upper coefficient of the first range and the first sum stored in the register;
determining thus that the number is lower than an upper-limit value of the range of the incoming PID numbers if the second sum does not cause setting of the carry-out indicator; and
determining thus that the number is within the range when the first sum causes setting of the carry-out indicator and the second sum does not cause setting of the carry-out indicator.

4. The method of checking numbers according to claim 3 wherein, in order to check if a number is equal to the lower-limit or the upper-limit value of the range of the incoming PID numbers, a check is made if the first sum or the second sum equals 0.

5. The method, according to claim 3 further comprising the step of changing the number by a correction coefficient when the number is within the range.

6. The method, according to claim 3 further comprising the steps of
determining thus that the number is equal to a lower-limit value of the range of the incoming PID numbers if the first sum equals zero and the number is equal to an upper-limit value of the range of the incoming PID numbers if the second sum equals zero; and
changing the number by a correction coefficient when the first sum or the second sum equals zero.

7. The method, according to claim 4 further comprising the step of checking sequentially further ranges of the ranges of incoming numbers and changing the number by a sequential correction coefficient when the number is within the range.

8. The method, according to claim 3 wherein the lower coefficient equals $(-low\_range\_X)$, the upper coefficient equals $(low\_range\_X - high\_range\_X)$ and the correction coefficient equals $(correction\_X + high\_range\_X)$, where correction$\_X$ is a correction value, low$\_range\_X$ is the lower-limit value of the range of the incoming PID numbers and the high$\_range\_X$ is the upper-limit value of the range of the incoming PID numbers.

9. The method according to claim 6 wherein values of each range of the ranges are stored in a sequence and at increasing addresses of the memory wherein a first value of the sequence is the lower coefficient, a second value of the sequence is the upper coefficient and a third value of the sequence is the correction coefficient.

* * * * *